United States Patent [19]

Paradinas et al.

[11] Patent Number: 5,796,831
[45] Date of Patent: Aug. 18, 1998

[54] METHOD FOR CONDUCTING A TRANSACTION BETWEEN A CHIP CARD AND AN INFORMATION SYSTEM

[75] Inventors: Pierre Paradinas, Coudekerque Branche; Jean-Jacques Vandewalle, Villenauve D'Aso, both of France

[73] Assignee: Gemplus, Gemenos, France

[21] Appl. No.: 455,279

[22] Filed: May 31, 1995

[30]     Foreign Application Priority Data

Jun. 3, 1994 [FR] France ................... 94 06858

[51] Int. Cl.⁶ ............... H04L 9/00; G06F 7/04; G06F 5/22; G07D 7/00
[52] U.S. Cl. ............... 380/24; 340/825.3; 340/825.31; 340/825.35; 235/379; 235/380; 235/381; 705/216; 705/239; 705/241; 705/242
[58] Field of Search ............ 380/4; 340/825.33, 340/825.34, 825.3, 825.31; 235/379, 380, 381; 364/400–408; 705/216, 239, 241, 242

[56]         References Cited

U.S. PATENT DOCUMENTS

| | | | |
|---|---|---|---|
| 4,361,754 | 11/1982 | Hoskinson et al. | 235/381 |
| 4,529,870 | 7/1985 | Chaum | 235/380 |
| 4,674,618 | 6/1987 | Eglise et al. | 194/210 |
| 4,877,947 | 10/1989 | Mori | 235/381 |
| 5,097,115 | 3/1992 | Ogasawara et al. | 235/380 |
| 5,175,416 | 12/1992 | Mansvelt et al. | 235/379 |
| 5,239,166 | 8/1993 | Graves | 235/380 |
| 5,438,184 | 8/1995 | Roberts et al. | 235/380 |
| 5,440,634 | 8/1995 | Jones et al. | 380/4 |
| 5,461,217 | 10/1995 | Claus | 235/380 |
| 5,537,313 | 7/1996 | Pirelli | 364/403 |

FOREIGN PATENT DOCUMENTS

| | | |
|---|---|---|
| EP-A- 0172670 | 2/1986 | European Pat. Off. |
| WO 89/02140 | 3/1989 | United Kingdom. |
| WO 93/08545 | 4/1993 | United Kingdom. |

Primary Examiner—Thomas H. Tarcza
Assistant Examiner—Hrayr A. Sayadian
Attorney, Agent, or Firm—Nilles & Nilles, S.C.

[57]          ABSTRACT

A method of conducting a transaction between a chip card and an information system protects against fraud and malfunction during the transaction. The method involves a multi-step recording procedure wherein the transaction is first temporarily recorded in the chip card and the information system, and then later is definitively recorded after it has been verified that both sides have performed the temporarily recording step. In order to perform the temporary recording, information which describes the transaction is sent to both the chip card and the information system from a transaction management device. In order to verify that both sides have performed the temporary recording, a first set of messages is sent from the chip card and the information system to the transaction management device which indicate that the temporary recording has been performed. The transaction management device receives these messages and responds by sending a second set of messages to the chip card and the information system. The chip card and the information system receive these messages and respond by changing the character of the previously performed recording from temporary to definitive. The transaction is protected against fraud and malfunction because the transaction must be successfully entered into the information system before it becomes available to a user of the chip card.

22 Claims, 2 Drawing Sheets

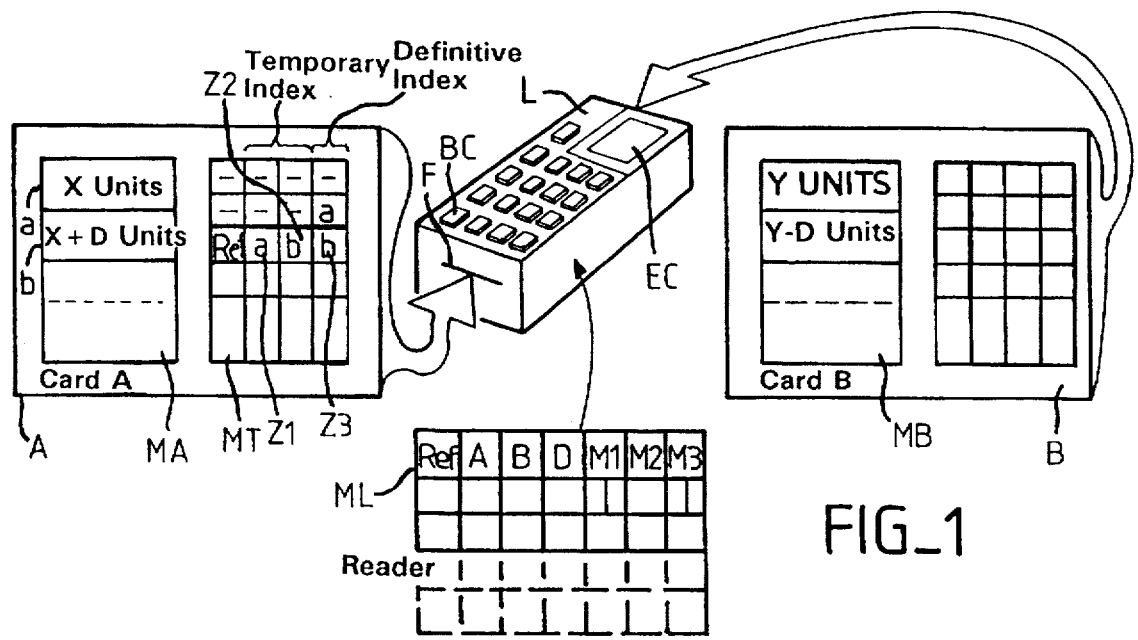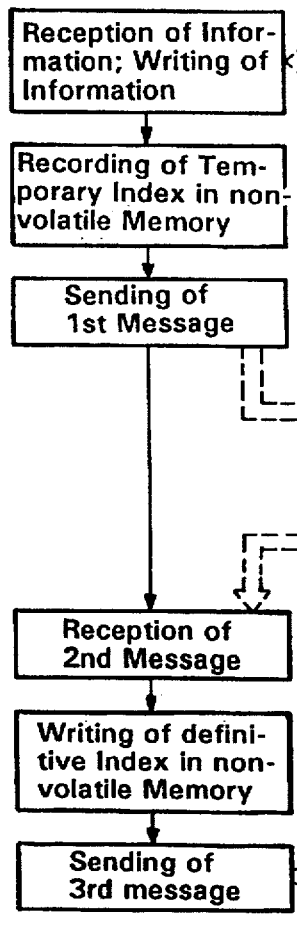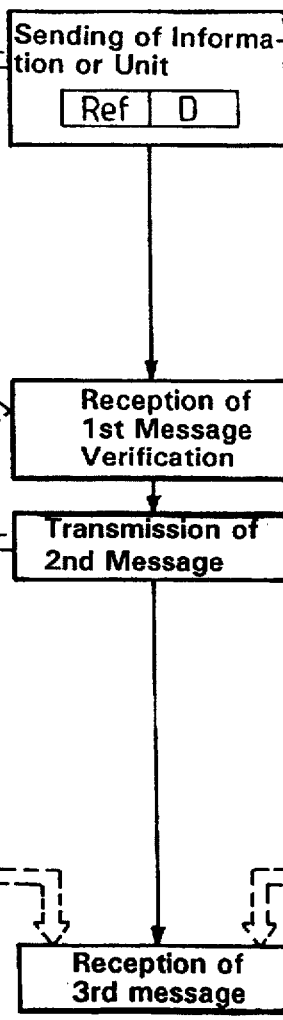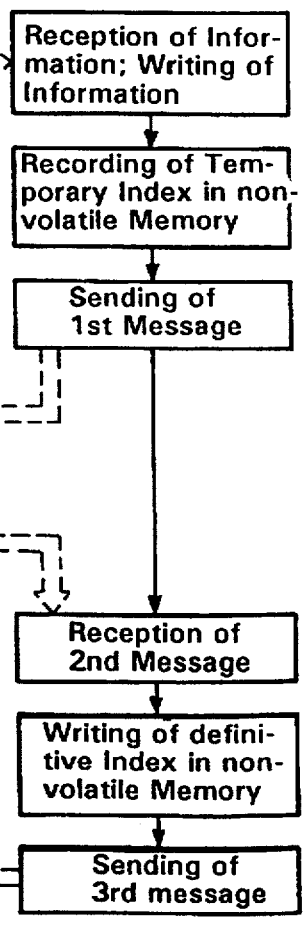

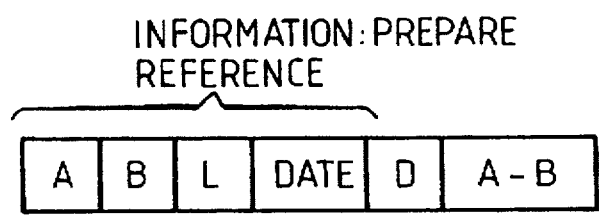
FIG_3
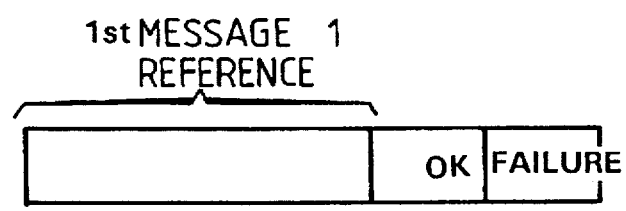
FIG_4a
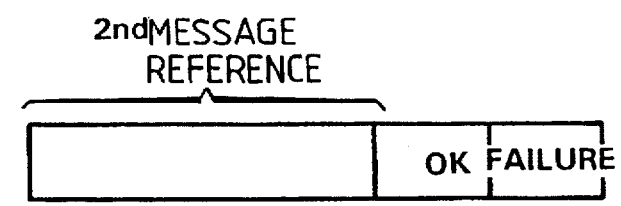
FIG_4b
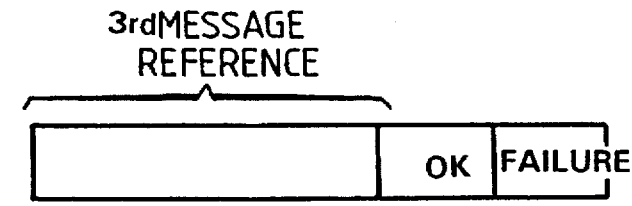
FIG_4c
FIG_4d

METHOD FOR CONDUCTING A TRANSACTION BETWEEN A CHIP CARD AND AN INFORMATION SYSTEM

BACKGROUND OF THE DESCRIPTION

1. Field of the Invention

An object of the invention is to provide a method for conducting a transaction between a chip card or smart card and an information system such as a data base. It is designed inter alia for use with chip cards of the electronic wallet type. With such cards, provision is made for the transfer of units representing sums of money from one chip card to another or from one chip card to an account memorized in a data base, or for the reverse operation. In the former case, in practice, the second chip card plays a role of an information system, for example the role of a data base, to store numbers of units. Instead of transferring units representing the exchange of money, it is also possible to provide for the exchange of information elements: for example a reservation would be recorded in a chip card while the subsequent corresponding unavailability of the service that has been reserved would be noted down in the data base. The method can thus be used with medical care type chip cards or even with known PCMCIA type chip cards which are furthermore used as memories.

2. Description of the Prior Art

This type of transaction has obvious problems. These problems are related to the fact that the credit of units, or the reservation, and more generally the information elements, may be borne in a carrier, for example a chip card, before being debited into the other chip card, for example, the data base, or into another chip card. It is therefore important to ensure the consistency of the transaction and see to it that there is no situation in which inconsistencies can arise.

In a first attempted solution, a system was devised in which the chip cards subjected to the transaction would be imprisoned in a mechanism that would prevent their physical removal from the unit managing the transaction before the end of the transaction. This type of mechanism however cannot be used on a general basis especially if, for reasons of convenience and because of the increasingly widespread use of chip cards, it is planned to put readers into service that are capable of making the transfer from one card to another and are furthermore available on a self-service basis at several places. The fact that it is possible, at any time, to remove one or both of the cards that are partners to a transaction requires the use of another solution. Further, it is appropriate, apart from any context of fraud, to make provision against malfunctions in a chip card or in the data base.

The problem also arises if, instead of exchanging units, it is planned for example to make reservations. A reservation would be recorded in a chip card while the making of the reservation would also be recorded in the data base in the name of the card-holder. It is also possible to conceive of other situations where consistency is required for information exchanges.

To resolve this problem, the invention comprises the idea of using a particular recording protocol. In the invention, in a first stage a temporary recording is made, in a non-volatile memory, of the final piece of information or the new state of the units (namely the state that they should have at the end of the transaction). These information elements or units are furthermore kept in the non-volatile memory in their initial state, before the transaction. Then, a message indicating that this type of preparation has been successfully concluded is sent to a device that manages the transaction. The transaction managing device then ascertains that it has received a message of the same type from all the partners to the transaction (in general there are only two of them but there could be several). If the transaction has occurred properly, the transaction managing device sends the different partners a second message informing them that the recording of the transaction may shed its temporary character and take on a definitive character instead. Thus, the chip card has an indication in its non-volatile memory showing that it is possible to shed the temporary character. It will be shown that this type of protocol can be used to withstand every attempt at fraud and every malfunction that could occur during the transaction.

SUMMARY OF THE INVENTION

An object of the invention is therefore a method for conducting a transaction between a chip card, notably of the electronic wallet type, and an information system, for example a data base, linked with each other by means of a chip card reader connected to the system, wherein said method comprises the following steps, once the chip card is linked with the system:

- an action for the updating of information, namely a debiting or crediting operation, is carrier out in the chip of the card,

- and an action for the updating of corresponding information, namely a crediting or debiting operation, is carried out in the system,

- the chip card and the system each send a first message to the transaction management device indicating that the corresponding updating operations, namely debiting and crediting operations, have been performed temporarily by the chip card and the system,

- the transaction management device verifies the consistency of these first messages and sends second messages to the card and/or to the system to inform them that the planned transaction is balanced between the participating units,

- the chip of the chip card is not allowed to function unless it has received and recorded the second message.

As a variant, the chip card and the data base record the definitive character of the transaction and send a third message to the managing device to report the reception of the second message, and the chip of the chip card is then allowed to use the information elements received only when it has sent the third message accurately.

BRIEF DESCRIPTION OF THE DRAWINGS

The invention shall be understood more clearly from the following description and from the appended figures which are given by way of an indication and in no way restrict the scope of the invention. Of these figures:

FIG. 1 shows a schematic view of a system that can be used to implement the invention;

FIGS. 2a to 2c are flow charts of actions to be performed, according to the invention, firstly in a chip card, secondly in an transaction management device and, thirdly, in a data base (which, besides, may also be a chip card);

FIG. 3 shows a schematic view of the types of second messages to be sent out by the transaction management device in response to the first messages received;

FIGS. 4a and 4d show preferred examples of information elements and/or messages exchanged among the different partners in the transaction.

MORE DETAILED DESCRIPTION

FIG. 1 shows a system that can be used to implement the method for conducting transactions according to the invention. This system has a chip card: the chip card A. The chip card A is for example of the electronic wallet type and contains a number X of stored units in a memory MA, for example at an address a. The units stored at the address a are stored in the form of data elements representing these units. However, these units could also be recorded in the form of fuse type memory cells capable of being obliterated when they are used up. In this case, the updating, the increasing of the contents, could be done by permitting access to new erasable memory cells or, as the case may be, by removing the obliteration of already obliterated memory cells. The data elements stored at the address a may also be data elements pertaining to the reservation of a service or of an entitlement. They may also be pure information elements. In this case, the transaction could be designed to certify the fact that the holder of the card A has received these information elements.

The chip card may be linked with a data base, represented herein as an example, by means of another chip card B of the same type as the above card. The link with the data base, or more generally with the information system, is set up by means of a chip card reader L. In the example, this chip card reader L has a set of control buttons BC as well as a control screen EC to provide a real-time display of the progress of the transaction or to enable an operator to comply with the requests made to him in order to satisfactorily carry out the different protocols for the recognition and progress of the transaction.

Thus, in a first stage, the chip card A is linked with the system, the data base being represented by the card B, by means of the reader L. This type of linking is known. For example, an operator inserts the chip card A into the reader L. In order that this card A may be recognized, the operator has to type in a password (known to him alone) with the buttons BC when asked to do so by a message appearing on the screen EC. When this recognition protocol is over, the operator or another operator performs actions of the same type by inserting the card B. As an alternative, the card is directly linked with the data base (or linked on a deferred basis by being connected in the evening or at night for example). In this case, the reader L itself contains the data base, at least in a temporary form.

In the most complex example where the data base is also a card B, the readers according to the invention, which can be used commercially, have two insertion slots such as F without a withdrawal-preventing flap. They will naturally enable the withdrawal of the cards A or B at any time, even if the recognition or the transaction is still in progress. In practice, the method of the invention will prevent all the problems that could result therefrom. Indeed, it would be illusory to design readers with mechanisms preventing this type of withdrawal: that would make them more complicated, costlier and would furthermore be utterly useless with regard to the inclinations of fraudulent individuals.

In a preferred way, the reader L has a memory ML in which the different transactions performed by means of this reader L are recorded.

FIGS. 2a to 2b show the different operations performed to implement the method of the invention. For example, FIG. 2b, once the cards A and B have been recognized, an operator plans to carry out a transaction by means of the control buttons BC. He decides, for example, to transfer a quantity D of units from the card B to the card A. Ultimately, it is thought that, in this way, the credit of units in the card A will be increased by debiting from the contents of the card B: thus, a payment is made. On the same basis, it is also possible to make a reservation, the reservation having to be written in the card A, the card B (or the equivalent data base) recording the fact that the reservation has been made on behalf of A.

This transaction therefore essentially comprises the sending of the information D, to which the transaction pertains, both to the card A and to the card B. It will be seen hereinafter that this information is more ample but, essentially, it must include an information element D, with D representing, for example, a certain number of units.

When the card A receives the information element D (FIG. 2a), it records it in a non-volatile memory. For example, whereas (FIG. 1) the card A possessed a number X of recorded units at an address a in its memory MA, it will now record a number of units X+D at an address b. In doing so, the card A, in the second stage of the method of the invention, will prepare and then send the reader L a first message informing it that the corresponding debit (or credit) operations have been made temporarily by the chip card A. To do this, the chip card A will firstly make a recording in a transaction memory MT (which may be physically the same as the memory MA that contains the units or another memory of the integrated circuit, the chip or the chip card) of an information element pertaining to the temporary storage of the data elements in the memory MA.

The memory MT has the particular feature of being non-volatile. The information corresponds to the first message essentially mentioning the temporary character of the recording of the transaction. For example, in the transaction memory MT, a recording is made in a recording line corresponding to the transaction in progress. This recording pertains to the following: in a first zone Z1, the address a mentioning the starting address of the information elements and in a second zone Z2 the address b providing information on the final address at the end of the transaction. When this is done, the chip card A furthermore sends the reader L a message by which it states preferably that, firstly, a recording has been made of the units X+D at the address b and that, secondly, the temporary index comprises the information b at the zones Z1, Z2. This substantially means that the transaction has been temporarily recorded properly.

The nature of the first message may be very simple, and may even be encoded on a single bit. It states that the temporary part of the method has truly occurred. This first message may preferably be more complicated. For example it may contain the address information elements a and b. It may even be enciphered or signed.

The reader L then receives this first message coming from the card A (FIG. 2b). It also ascertains that it has received a corresponding message coming from the card B. The card B has of course recorded the transaction in the reverse direction. Its contents in terms of units, which were initially equal to Y, have been temporarily taken to a value Y−D. When the transaction management device, preferably contained in the reader L, notes that the information elements transmitted are consistent, it sends out a second message to the card A and the card B. The aim of this second message is to make the temporary transaction, which had been recorded beforehand, definitive.

The card A and the card B then receive the second message (FIGS. 2a and 2c). They then record a final index in the non-volatile memory MT mentioning the definitive character of the transaction. For example, in a third zone Z3 of the memory MT, the card A records the address b in the event of success or the address a in the event of failure. This means that the information to be used is now the information to be taken at the address, or a, mentioned in Z3. It can immediately be seen that if the transaction had failed or if the contents of the second message had been a message of failure, the card A would have had, in the zone Z3, either an absent information element or the information element a. This would have meant that the address of the definitive value at the end of the transaction would have been the address a, namely the address that had been the current address before the start of the transaction. It is thus possible to decide that, in the event of an absence of an address or of information in the zone Z3, it is the zone Z1 that takes precedence. For example (cf. FIG. 1, memory MT), above the recording pertaining to the transaction in progress, it has also been shown, in the zone Z3 and for a previous transaction, that the valid information was stored at the address a.

The program applied by the card A to make the transaction definitive is therefore simple. In the event of a failure of the transaction, the contents of the zone Z1 are carried into the zone Z3. In the event of the success of the transaction, the contents of the zone Z2 are carried into the zone Z3. Naturally, if the card is withdrawn before the second message has reached it, there will be nothing recorded in the zone Z3 and, consequently, it could be deduced therefrom that the transaction has failed. If need be, the zone Z1 and the zone Z3 could be merged into one zone if it is sought to gain space in the memory. Naturally, a similar step would occur in the card B or in the data base that it is supposed to represent. A similar mechanism can be obtained in another way. For example, the zones Z1–Z3 are attached to recordings of the memory MA. The recording of this memory which is valid has at least one additional bit showing that it is active. The card B is preferably made with one and the same structure.

Preferably, the card A and the card B have a systematic microprogram preventing them from working so long as the zone Z3 of the last recording in the memory MT or its equivalent has not been provided with information. In this way, a card A having undergone a problem is neutralized. This microprogram furthermore has a systematic restarting operation directed to the reader L to receive a message of the second type. This second message is, apart from normal cases of use, systematically a message of the failure of the transaction. It cannot be considered, for example, to be a message of success unless its deciphering enables it. In every other case, it leads to the obligation to redo the transaction.

At a practical level, the operations in the cards and the reader may be done on a shared-time basis and may appear, on a time-scale perceptible to an operator, to be done at the same time in real time.

At the end of the transaction, the card A and the card B send the reader L a third message informing it that the transaction has been perfect as far as they are concerned.

Preferably, with each transaction that it performs, the reader makes a recording in the memory M. This recording substantially contains a reference Ref of the transaction, the identification A of the first partner, the card A, the identification B of the second partner, the card B, the contents D of the transaction (with the direction of the transaction depending on whether the card A has been debited or credited), the contents in a zone M1 of the first message received both from the card A and from the card B, the contents in a zone M2 of the second message sent to each of the two partners as well as the contents, in a zone M3, of the third message received from these two partners at the end of the transaction.

In one example (FIG. 3), the first message received from the card A may be on message OK, a message FAILURE or again no message (or an incomprehensible message) if the card has been disconnected before the performance of the transaction or again if the card A is malfunctioning. The same is the case with regard to the card B. The contents of these two messages are stored in the corresponding zones M1 of the memory M. The reader L then prepares a message OK only if the first two messages received are OK or a message FAILURE in all other cases. The contents of the second message, OK or FAILURE, are then sent to the card A and to the card B. These cards, on receiving these message, continue to perform the rest of the transaction and send the reader L the result of their action.

FIGS. 4a to 4d show preferred examples of messages exchanged between the reader L and the chip card or chip cards. The information sent by the reader L, which corresponds to a request for the preparation of the transaction, preferably comprises a transaction reference. This reference preferably includes, in non-enciphered or enciphered form, information on the name of the first partner a, the second partner B, the identification of the reader L with which the transaction has been performed as well as the date on which this transaction has been performed or other information elements. This information also includes the value of the information sent: D. It also included the direction A to B (or B to A) depending on whether the operation is an operation to debit the card A or to credit this card A.

The first message sent out by the card A will preferably repeat all or a part of this reference as well as the result of the preparation: OK or FAILURE. The second and third messages will be formed in the same way.

Preferably, the data elements pertaining to the reference as well as to the result of the transaction will be encrypted by cryptographic algorithms contained in the cards A and/or B and, furthermore, known to the reader L. Such cryptographic methods are used in particular in the prior art to perform the preliminary recognition of the cards by the reader.

Preferably, the contents of this dispatch and its messages will be signed. For example, at each operation of transmission or reception, a transmission/reception counter or a transmission counter or reception counter will increase its contents by one unit and the cryptogram sent, relating to the value of the message, takes account of the state of this counter in order to have its parameters set. In this way, if a message has to be reiterated, it will never by reiterated in the same way from one instance to another.

When a transaction has failed, it is possible to have a situation such that there is no indication thereof in the zone Z3 of the memory MT of the card. In this case, the microprogram of the card A sends a request to the reader L seeking to receive the second message a second time so that the zone M3 can be definitively informed. It can be seen with this system that it is possible, whenever the zone Z3 is not informed, to re-dispatch a request to the reader as often as is necessary. The request will comprise the identification of the transaction by the reference Ref. Upon reception of this request, the reader will retransmit the second message that could be received and interpreted accordingly. It is clear that, since the parameters of the transaction are not known, one reader or another, referenced L', could only send a message of the second type that is false. This message will then be interpreted as a message of failure.

If the transaction to be implemented is a debit-credit type of transaction, it is possible to plan first of all to validate the debiting (of the card B) before sending a second message OK to the card A to be credited. In this way, the creating of change to be returned is avoided. In this case the data base, namely the card B, will send its third message. The reader L will receive it and then, only after this, will it send the second message to the card A.

It can be seen that the method of the invention makes it possible to carry out the deferred-time operations that will have to be set up with the technique of electronic wallet type chip cards. Indeed, the data base which may be contained in the reader L and is actually formed by the recordings of the memory ML may be used to update a data base contained in the central files of a bank. For example, the reader L is connected every evening to a central file of the bank in question. The fact furthermore of transmitting the reference relating to the transaction enable the identification, in the event of subtle fraud, of the intervening party A, B, or L that is routinely carrying out prohibited operations.

To further improve the method of the invention, it may be planned to make the transaction definitive only after a double check in such a way that a fourth message has to be sent by the reader L to the cards A and B. Only the reception by these cards A and B of this second confirmation of the exchange will be equivalent to a perfect transaction. An additional zone Z4 would then set up in the memory MJ to manage this situation.

The chip of the card A preferably has a microprocessor and a memory linked with this microprocessor. This memory may comprise a static or dynamic random-access memory used as a working memory and a EPROM type memory used as a non-volatile memory MA-MT, and may store performable programs, basic data (secret codes, identification and signatures) and data elements resulting from the transaction. The non-volatile memory may also be a random-access memory protected by a cell.

For the management of the transaction, the processor chosen will preferably be a microprocessor contained in the reader. It is possible however to envisage a structure where the control of the transaction is carried out by the microprocessor of one of the chip cards or by a microprocessor that would be dedicated to the management of the data base.

What is claimed is:

1. A method for conducting a transaction between a chip card and an information system, the chip card and the information system being linked with each other by a transaction management device, wherein the method comprises the following steps, which are performed after the chip card is linked with the information system:

temporarily recording the transaction, including the steps of temporarily recording the transaction in the chip card, including the step of temporarily performing and update of information in the chip card, the update thereby having a temporary character, temporarily recording the transaction in the information system, including the step of temporarily performing an update of corresponding information in the information system, verifying that the temporarily recording step has been performed in both the chip card and the information system, including the steps of sending a first chip card message from the chip card to the transaction management device, the first chip card message indicating that the transaction has been temporarily recorded in the chip card, sending a first information system message from the information system to the transaction management device, the first information system message indicating that the transaction has been temporarily recorded in the information system, receiving the first chip card message and the first information system message in the transaction management device, and in response sending a second chip card message to the chip card to inform the chip card that the transaction is balanced between the chip card and the information system, definitively recording the transaction in the chip card, the definitively recording step occurring in response to the reception of the second message at the chip card, and wherein the chip card is not allowed to function unless it has received and recorded the second message.

2. A method according to claim 1, wherein the chip card sends a third chip card message to the transaction management device to report the reception of the second message, and wherein the chip card is allowed to use the updated information only when it has sent the third chip card message accurately.

3. A method according to claim 1 wherein the chip card records the following in a non-volatile memory:

a temporary result of the updating action, and a indication pertaining to the first chip card message, and an indication pertaining to the second chip card message.

4. A method according to claim 1, further comprising the following steps, performed by the transaction management device:

initiating the transaction, and sending information elements relating to the transaction to the chip card and to the information system.

5. A method according to claim 1, wherein the chip card is a first chip card, and wherein the information system is contained in a second chip card.

6. A method according to claim 2, wherein the first, second and third chip card messages comprise a reference which identifies the transaction.

7. A method according to claim 1, wherein the exchanges among the card, the reader and the system are encrypted.

8. A method according to claim 1, wherein a second information system message is sent to the information system, and wherein the information system sends a third information system message to inform the transaction management device of the reception at the information system of the second information system message before the second chip card message is sent to the chip card.

9. A method according to claim 2, wherein upon the reception of the third chip card message, the transaction management device sends a fourth chip card message to the chip card to confirm that the chip card and the information system should consider the transaction to be of a definitive character.

10. A method according to claim 1, wherein the chip card sends requests for the second chip card message so long as the second chip card message has not been received.

11. A method according to claim 1, wherein the exchanges among the card, the reader and the system are signed.

12. A method of conducting a transaction between first and second chip cards, the first and second chip card being linked by a transaction management device, the method comprising the steps of A. sending transaction information which describes the transaction the transaction information being sent from the transaction management device to the first and second chip cards; then B. temporarily recording the transaction in the first and second chip cards, including the step of performing an update of information previously stored information in the first and second chip cards, the update being performed based on the transaction information, and the update having a temporary character; then C. verifying that the temporarily recording step has been correctly performed in both the first and second chip cards; and D. in response to the verifying step, definitively recording the transaction in the first and second chip cards, including the step of changing the character of the previously performed temporary update from temporary to definitive.

13. A method according to claim 12, wherein the temporarily recording step comprises the step of sending a first message from each of the first and second chip cards to the transaction management device, the first message describing the transaction, and wherein the verifying step comprises the step of comparing the first message sent by the first chip card with the first message sent by the second chip card to ensure consistency.

14. A method according to claim 13 wherein, in response to the verifying step, a second message is sent from the transaction management device to each of the first and second chip cards, the second message causing the first and second chip cards to perform the definitively recording step.

15. A method according to claim 14, wherein the first chip card sends a third message to the managing device to report the reception of the second message, and wherein the first chip card is allowed to utilize the transaction information only when it has sent the third message accurately.

16. A method according to claim 14, wherein the first chip card sends a third message to the transaction management device to report the reception of the second message, and wherein the transaction management device sends the second message to the second chip card after receiving the third message from the transaction management device.

17. A method according to claim 16, further comprising the step of sending a fourth message from the transaction management device to the first and second chip cards, the fourth message confirming the definitive character of the update.

18. A method according to claim 17, wherein the first chip card sends requests for the second message so long as the second message has not been received by the first chip card.

19. A method of conducting a transaction between a chip card and an information system, the chip card and the information system being linked by a transaction management device, the transaction relating to a transferring of units between the chip card and the information system, the method comprising the steps of A. temporarily recording the transaction in the chip card, including the steps of
  1. sending a transaction count of units from the transaction management device to the chip card, then
  2. altering an original count of units so as to form an altered count of units, the original count of units being stored in a first memory zone of the chip card, and the original count of units being altered by the transaction count of units, and then
  3. storing the altered count of units in a second memory zone of the chip card, the altered count of units being stored so as to have a temporary character;

B. temporarily recording the transaction in the information system;

C. verifying that the temporarily recording step (B) has been correctly performed in the information system;

D. in response to the verifying step (C), definitively recording the transaction in the chip card by changing the character of the altered count of units from temporary to definitive, the definitively recording step including the step of copying the altered count of units stored in the second memory zone to a third memory zone of the chip card, the chip card then referencing the third memory zone in order to determine a number of available units.

20. A method according to claim 19 wherein, in the event of a failed transaction, the original count of units is copied from the first memory zone to the third memory zone.

21. A method according to claim 20, wherein the chip card is unable to function if the third memory zone is empty.

22. A method according to claim 20, wherein the chip card is a first chip card, and wherein the information system is stored in a second chip card.

* * * * *